US010308792B2

(12) United States Patent
Sandstrom et al.

(10) Patent No.: US 10,308,792 B2
(45) Date of Patent: Jun. 4, 2019

(54) RUBBERY BLEND CONTAINING TRANS ISOPRENE-BUTADIENE COPOLYMER

(71) Applicant: The Goodyear Tire & Rubber Company, Akron, OH (US)

(72) Inventors: Paul Harry Sandstrom, Cuyahoga Falls, OH (US); Xiaoping Yang, Streetsboro, OH (US); Kuo-Chih Hua, Richfield, OH (US); James Joseph Golden, North Canton, OH (US); Daniel Ray Beha, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/687,958

(22) Filed: Aug. 28, 2017

(65) Prior Publication Data

US 2017/0355834 A1 Dec. 14, 2017

Related U.S. Application Data

(63) Continuation-in-part of application No. 14/048,598, filed on Oct. 8, 2013, now abandoned.

(51) Int. Cl.
| *C08L 9/00* | (2006.01) |
| *C08F 236/06* | (2006.01) |
| *C08F 236/08* | (2006.01) |
| *C08L 7/00* | (2006.01) |
| *C08K 3/04* | (2006.01) |
| *C08K 3/36* | (2006.01) |
| *B60C 1/00* | (2006.01) |

(52) U.S. Cl.
CPC .............. *C08L 9/00* (2013.01); *B60C 1/0016* (2013.01); *B60C 1/0025* (2013.01); *C08F 236/06* (2013.01); *C08F 236/08* (2013.01); *C08L 7/00* (2013.01); *C08K 3/04* (2013.01); *C08K 3/36* (2013.01); *C08L 2666/08* (2013.01); *C08L 2666/72* (2013.01)

(58) Field of Classification Search
CPC .......... C08L 9/00; C08L 7/00; C08L 2666/08; C08L 2666/72; C08F 236/08; C08F 236/06; C08K 3/04; C08K 3/36; B60C 1/0016; B60C 1/0025
USPC ........................................................ 524/495
See application file for complete search history.

(56) References Cited

U.S. PATENT DOCUMENTS

| 4,094,831 A | 6/1978 | Sandstrom |
| 4,103,077 A | 7/1978 | O'Mahoney, Jr. |
| 4,124,546 A | 11/1978 | Rubio, Jr. et al. |
| 4,124,750 A | 11/1978 | O'Mahoney, Jr. |
| 4,198,324 A | 4/1980 | Lal et al. |
| 4,243,561 A | 1/1981 | Lal et al. |
| 4,254,013 A | 3/1981 | Friedman et al. |
| 5,844,044 A | 12/1998 | Sandstrom et al. |

FOREIGN PATENT DOCUMENTS

| CN | 103205030 A | * | 7/2013 | |
| CN | 103387641 A | * | 11/2013 | |
| EP | 1512553 A1 | | 3/2005 | |
| EP | 1593528 A1 | * | 11/2005 | ........... B60C 1/0016 |
| EP | 1593528 A1 | | 11/2005 | |
| JP | 03210344 A | | 9/1991 | |

OTHER PUBLICATIONS

Hewitt, Section. 2.2 "Compounding Precipitated Silica in Natural Rubber: Silica and Carbon Black," pp. 25-27, Norwich, NY: William Andrew Publishing. (Year: 2007).*
CN 103205030 A, machine translation, Google Patents. (Year: 2013).*
CN 103387641 A, machine translation, Google Patents. (Year: 2013).*
He, et al "Properties of a New Synthetic Rubber: High Trans 1, 4-Polybutadiene-co-isoprene) Rubber", J.Appl. Polym. Sci., vol. 92 No. 5, 2941-2948 (2004).
Morton, Maurice, "Processing and Vulcanization Tests." Rubber Technology, New York, New York, Van Nostrand Reinhold, 1987, pp. 105-113.
EP Search Report, EP Patent Application 14187854.6-1302.

* cited by examiner

*Primary Examiner* — Josephine L Chang
(74) *Attorney, Agent, or Firm* — Alvin T. Rockhill

(57) ABSTRACT

The subject invention is directed towards tire components comprising rubber compositions comprising (1) about 2 phr to about 45 phr of a trans-1,4-isoprene-butadiene copolymer which has about 4 weight percent to about 16 weight percent butadiene repeat units and from about 84 weight percent to about 96 weight percent isoprene repeat units, wherein the trans-1,4-isoprene-butadiene copolymer has a Mooney ML 1+4 viscosity which is within the range of about 35 to about 80; and (2) about 55 phr to about 98 phr of at least one other elastomer, preferably a diene based elastomer. The most preferred tire components are those which contain cord reinforcements and require adequate green strength to enhance the tire building and shaping process to maintain cord integrity in the final cured tire.

10 Claims, No Drawings

RUBBERY BLEND CONTAINING TRANS ISOPRENE-BUTADIENE COPOLYMER

This is a continuation-in-part of U.S. patent application Ser. No. 14/048,598, filed on Oct. 8, 2013. The teachings of U.S. patent application Ser. No. 14/048,598 are incorporated herein by reference in their entirety.

BACKGROUND OF THE INVENTION

The strength of unvulcanized rubber is commonly referred to as "green strength". It is the tensile strength or tensile modulus of an uncured rubber formulation. It is normally quantified in terms of the stress-strain characteristics of the pure rubber or the rubber formulation of interest. Green strength can also be thought of in terms of stress elongation, tensile strength, and creep. ASTM D6746 provides a test method for quantifying green strength. A standard test for measuring green strength is also delineated in the International Standard ISO 9026. In any case, having adequate green strength is critical in the processing of rubber and rubber formulations into useful products. Green strength is the property of a rubbery polymer which allows for it to be built into multiple component articles with little or no release or relative movement of the assembled components subsequent to assembly and prior to initiation of the curing operation.

A high level of green strength is normally desirable to attain good rubber processing behavior. It is a particularly important characteristic for all processing operations in which elongation predominates. For instance, adequate green strength is required for a rubber formulation to perform well in extrusions, calendaring, and tire building operations. In other words, it is important for rubber compounds to have sufficient green strength to be built into rubber composites, such as tires. It is particularly important for the rubber and rubber compounds used in building large tires to have a high level of green strength in order for the rubber layers of the tire to adhere together during the tire building process. It is particularly important in the second stage of building radial tires and in building large tires for trucks, industrial equipment, and earthmovers. In cases where green tires are built with rubber compounds that exhibit poor green strength the tire may fail to hold air during expansion in the second stage of the tire building process prior to cure.

Natural rubber inherently exhibits a relatively high level of green strength. For this reason it is commonly used in building large tires for trucks, industrial equipment, mining equipment, and earthmovers. However, in some applications it would be desirable to further increase the green strength of the natural rubber to more easily facilitate the tire building process. Over the years numerous approaches for increasing the green strength of rubber formulations have been considered. Nevertheless, increasing the green strength of natural rubber in commercial application has proven to be a formidable task.

U.S. Pat. No. 4,094,831 indicates that the green strength of synthetic elastomers can be improved by forming interpolymers from at least one type of various synthetic elastomer forming monomers with an epoxy containing monomer. The elastomer forming monomers employed in the practice of this invention include at least one conjugated diene having from 4 to 10 carbon atoms, olefins having from 2 to 14 carbon atoms, and a diene having from 4 to 6 carbon atoms, and combinations thereof. The interpolymer described by U.S. Pat. No. 4,094,831 are preferably blended with synthetic elastomers or natural rubber (cis-1,4-polyisoprene) and are utilized in various industrial applications, such as in tire carcasses including radial truck tire carcasses. U.S. Pat. No. 4,094,831 indicates that green strength can be further improved if a small amount of an epoxy cross-linking agent is utilized. Examples of suitable cross-linking agents include monoamines and polyamines, monoanhydrides and polyanhydrides, and monocarboxylic acids, as well as polycarboxylic acids.

U.S. Pat. Nos. 4,103,077 and 4,124,750 disclose techniques for improving the green strength of synthetic elastomers by cross-linking them with a dihydrazide compound. U.S. Pat. No. 4,103,077 more specifically reveals a process for improving the green strength of synthetic elastomers, comprising: mixing a synthetic elastomer with a small amount of a dihydrazide compound having the formula $NH_2$—NH—CO—R—CO—NH—$NH_2$, where R is an alkyl group having from 2 to 10 carbon atoms to form a mixture, said synthetic elastomer being made from the solution polymerization of monomers including dienes containing from 4 to 10 carbon atoms, comonomers of dienes containing from 4 to 10 carbon atoms to form copolymers, and comonomers of dienes containing from 4 to 10 carbon atoms with olefin monomers containing from 2 to about 14 carbon atoms to form copolymers; producing an improved green strength elastomer by partially cross-linking said elastomer to effect less than a vulcanized elastomer; and heating said elastomer dihydrazide mixture at a temperature of from about 125° F. (52° C.) to about 300° F. (149° C.). These patents further disclose a synthetic elastomer composition having improved green strength, comprising: a partially cross-linked and non-vulcanized synthetic elastomer; from about 0.25 to about 2.0 parts by weight per 100 parts of said elastomer of a dihydrazide compound having the formula $NH_2$—NH—CO—R—CO—NH—$NH_2$, wherein R is an alkyl group having from 2 to 10 carbon atoms, said synthetic elastomer made from monomers selected from the group consisting of dienes having from 4 to 10 carbon atoms, comonomers of dienes having from 4 to 10 carbon atoms to form copolymers, and comonomers of dienes having from 4 to 10 carbon atoms with olefin monomers having from 2 to about 14 carbon atoms to form copolymers.

U.S. Pat. No. 4,124,546 discloses that the improved green strength of elastomers made from monomers selected from the class consisting of at least one conjugated diene having from 4 to 10 carbon atoms, olefins having from 2 to 14 carbon atoms along with a diene having from 4 to 6 carbon atoms, and combinations thereof can be achieved by adding an amount of a polydimethylbutadiene compound to form a blend having a glass transition temperature of from about 0° C. to about −100° C. The polydimethylbutadiene compound may be merely the homopolymer of dimetylbutadiene, the copolymer, the terpolymer or the tetrapolymer of dimethylbutadiene in various combinations with monomers, such as butadiene, isoprene, piperylene, acrylonitrile, vinylidene chloride, vinyl pyridine, methacrylic acid and vinyl substituted aromatic compounds.

U.S. Pat. Nos. 4,198,324 and 4,243,561 reveal that the green strength of elastomers can be improved by the addition of semi-crystalline butene polymers, such as polybutene and interpolymers made from 1-butene monomer and at least one monomer selected from the class consisting of α-olefins, non-conjugated dienes, and non-conjugated polyenes. The semi-crystalline butene polymer is mixed with a desired elastomer such as natural or synthetic cis-1, 4-polyisoprene, or a synthetic elastomer made from monomers selected from the class consisting of conjugated dienes having from 4 to 10 carbon atoms, interpolymers of said dienes among themselves or with vinyl substituted aromatic hydrocarbon compounds having from 8 to 12 carbon atoms, or polyalkenylenes. The mixing or blending of the butene polymer and the elastomer may be through conventional methods such as cement mixing or mastication.

U.S. Pat. No. 4,254,013 indicates that the green strength of elastomer blends of natural or synthetic cis-1,4-polyisoprene and synthetic elastomers can be improved by adding to the chain of the synthetic elastomer an ionogenic compound. The ionogenic compound can be incorporated into the chain of the synthetic elastomer through conventional polymerization with the monomers forming the synthetic elastomer, and the ionogenic group of the compound will be pendant from the chain or backbone of the elastomer. The ionogenic group is combined with a readily ionogenic metal base or salt. This combination yields blends which have greatly improved green strength.

SUMMARY OF THE INVENTION

The subject invention is based upon the discovery that certain trans-1,4-isoprene-butadiene copolymers can be incorporated into natural rubber or synthetic elastomers to improve the green strength thereof. The trans-1,4-isoprene-butadiene copolymers utilized in the practice of this invention contain about 4 weight percent to about 16 weight percent 1,3-butadiene repeat units and from about 84 weight percent to about 96 weight percent isoprene repeat units. The trans-1,4-isoprene-butadiene copolymer employed in the practice of this invention also typically has a Mooney ML 1+4 viscosity which is within the range of about 35 to about 80 and typically has a melting point which is within the range of 30° C. to 65° C.

The present invention more specifically relates to a rubber composition which is comprised of (1) about 2 phr to about to about 45 phr of a trans-1,4-isoprene-butadiene copolymer which has about 4 weight percent to about 16 weight percent 1,3-butadiene repeat units and from about 84 weight percent to about 96 weight percent isoprene repeat units, wherein the trans-1,4-isoprene-butadiene copolymer has a Mooney ML 1+4 viscosity which is within the range of about 35 to about 80; and (2) about 55 phr to about 98 phr of at least one other elastomer.

The subject invention also reveals a tire which is comprised of a generally toroidal-shaped carcass, a circumferential belt, overlay, with an outer circumferential tread, two spaced beads, at least one ply extending from bead to bead, chafer, apex, innerliner and sidewalls extending radially from and connecting said tread to said beads, wherein at least one of these tire components contains a rubber blend which is comprised of (1) about 2 phr to about 45 phr of a trans-1,4-isoprene-butadiene copolymer which has about 4 weight percent to about 16 weight percent 1,3-butadiene repeat units and from about 84 weight percent to about 96 weight percent isoprene repeat units, wherein the trans-1,4-isoprene-butadiene copolymer has a Mooney ML 1+4 viscosity which is within the range of about 35 to about 80; and (2) about 55 phr to about 98 phr of at least one other elastomer. The preferred components for this rubber blend are the belt, ply and overlay compounds which contain various types of reinforcing continuous cords.

DETAILED DESCRIPTION OF THE INVENTION

The rubber composition of this invention are made by simply blending from about 2 phr (parts per 100 parts by weight of rubber) to about 45 phr of a trans-1,4-isoprene-butadiene copolymer with about 55 phr to about 98 phr of at least one other elastomer, with the preferred elastomer being diene based and consisting of a synthetic or a natural high cis-1,4-polyisoprene. It is important for the trans-1,4-isoprene-butadiene copolymer to contain from about 4 weight percent to about 16 weight percent 1,3-butadiene repeat units and from about 84 weight percent to about 96 weight percent isoprene repeat units. It is also important for the trans-1,4-isoprene-butadiene copolymer to have a Mooney ML 1+4 viscosity as measured at a temperature of 100° C. which is within the range of about 35 to about 80. Mooney ML 1+4 viscosities are typically measured at a temperature of 100° C. and are understood throughout the tire and rubber industry to be measured at 100° C. unless indicated otherwise. All of the Mooney ML 1+4 viscosities referenced herein are as determined at a temperature of 100° C.

The trans-1,4-isoprene-butadiene copolymer utilized in the practice of this invention will more typically contain from 6 weight percent to 14 weight percent 1,3-butadiene repeat units and from about 86 weight percent to about 94 weight percent isoprene repeat units. The trans-1,4-isoprene-butadiene copolymer will preferably contain from 8 weight percent to 12 weight percent 1,3-butadiene repeat units and from 88 weight percent to about 92 weight percent isoprene repeat units. In most cases the trans-1,4-isoprene-butadiene copolymer will have a Mooney ML 1+4 viscosity at 100° C. which is within the range of 40 to 75 and will typically have a Mooney ML 1+4 viscosity at 100° C. which is within the range of about 45 to about 70. The trans-1,4-isoprene-butadiene copolymer will preferably have a Mooney ML 1+4 viscosity at 100° C. which is within the range of about 50 to about 60. The trans-1,4-isoprene-butadiene copolymer utilized in the practice of this invention can also be characterized in that it has a melting point which is within the range of about 30° C. to about 65° C.

The trans-1,4-isoprene-butadiene copolymer can be incorporated into a wide variety of rubbery polymers to improve the green strength thereof. For example, the trans-1,4-isoprene-butadiene copolymer can be used to improve the green strength of virtually any rubber or elastomer containing olefinic unsaturation. The phrases "rubber or elastomer containing olefinic unsaturation" or "diene based elastomer" are intended to include both natural rubber and its various raw and reclaim forms, as well as various synthetic rubbers. In this description, the terms "rubber" and "elastomer" may be used interchangeably, unless otherwise indicated. The terms "rubber composition", "compounded rubber", "rubber compound" and "rubber formulation" are used interchangeably to refer to rubber which has been blended or mixed with various ingredients and materials and such terms are well known to those having skill in the rubber mixing or rubber compounding art.

Some representative examples of synthetic polymers into which the trans-1,4-isoprene-butadiene copolymer can be incorporated to improve the green strength thereof include the homopolymerization products of butadiene and its homologues and derivatives, such as methylbutadiene, dimethylbutadiene, and pentadiene, as well as copolymers, such as those formed from butadiene or its homologues or derivatives with other unsaturated monomers. Among the latter may be acetylenes (i.e., vinyl acetylene), olefins (i.e., isobutylene, which copolymerizes with isoprene to form butyl rubber), vinyl compounds (i.e., acrylic acid or acrylonitrile, which polymerize with butadiene to form NBR), methacrylic acid, and styrene (which polymerizes with butadiene to form SBR), as well as vinyl esters and various unsaturated aldehydes, ketones and ethers, e.g., acrolein, methyl isopropenyl ketone, and vinylethyl ether.

Specific examples of synthetic rubbers that can be used in making the rubber compositions of this invention include neoprene (polychloroprene), polybutadiene (including cis-1,4-polybutadiene), polyisoprene (including cis-1,4-polyisoprene), butyl rubber, halobutyl rubber (such as chlorobutyl rubber or bromobutyl rubber), styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. The technique of this invention is typically of greatest benefit in improving the green strength of natural rubber, synthetic polyisoprene homopolymer rubber, polybutadiene rubber, styrene-butadiene rubber, isoprene-butadiene rubber, styrene-isoprene rubber, and styrene-isoprene-butadiene rubber. These polymers can be star-branched polymers which are coupled with a silicon halide or a tin halide, such as silicon tetrachloride or tin tetrachloride.

The rubber compositions of this invention are made by simply mixing the trans-1,4-isoprene-butadiene copolymer into the other elastomer using any conventional means that can be employed to attain a relatively homogeneous blend. For instance, the trans-1,4-isoprene-butadiene copolymer can be mixed into the other elastomer on a mill mixer or in a Banbury mixer using known mixing techniques.

The rubber compositions of this invention can also contain conventional reinforcing fillers, such as carbon black or silica. Carbon blacks are typically used as a filler in an amount ranging from 10 phr to 150 phr. The carbon black can have iodine absorptions ranging from 9 to 145 g/kg and DBP number ranging from 34 to 150 cm3/100 g. Other fillers may be used in the rubber composition including, but not limited to, particulate fillers including ultra-high molecular weight polyethylene (UHMWPE), crosslinked particulate polymer gels, and plasticized starch composite filler. Such other fillers may be used in an amount ranging from 1 to 30 phr.

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils.

The rubber composition may further include from about 10 to about 150 phr of silica. Siliceous pigments which may be used in the rubber compound include conventional pyrogenic and precipitated siliceous pigments (silica). Such conventional silicas might be characterized, for example, by having a BET surface area, as measured using nitrogen gas. The BET surface area may be in the range of about 40 to about 600 square meters per gram. The conventional silica may also be characterized by having a dibutylphthalate (DBP) absorption value in a range of about 100 to about 400, alternatively about 150 to about 300.

It may readily be understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. In many cases microcrystalline waxes are used. Typical amounts of peptizers comprise about 0.1 to about 1 phr. Typical peptizers may be, for example, pentachlorothiophenol and dibenzamidodiphenyl disulfide.

Accelerators may be used to control the time and/or temperature required for vulcanization and to improve the properties of the vulcanizate. A single accelerator system may be used, i.e., primary accelerator. The primary accelerator(s) may be used in total amounts ranging from about 0.5 to about 4 phr. Combinations of a primary and a secondary accelerator may be used with the secondary accelerator being used in smaller amounts, such as from about 0.05 to about 3 phr, in order to activate and to improve the properties of the vulcanizate. Combinations of these accelerators may be expected to produce a synergistic effect on the final properties and are somewhat better than those produced by use of either accelerator alone.

In addition, delayed action accelerators may be used which are not affected by normal processing temperatures, but produce a satisfactory cure at ordinary vulcanization temperatures. Vulcanization retarders might also be used. Suitable types of accelerators that may be used are amines, disulfides, guanidines, thioureas, thiazoles, thiurams, sulfenamides, dithiocarbamates and xanthates.

The rubber formulation of this invention including the trans-1,4-isoprene-butadiene copolymer can be mixed utilizing a thermomechanical mixing technique. The mixing of the cover layer rubber formulation can be accomplished by methods known to those having skill in the rubber mixing art. For example, the ingredients are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) of the preceding non-productive mix stage(s). The rubber, silica and sulfur containing organosilicon, and carbon black, if used, are mixed in one or more non-productive mix stages. The terms "non-productive" and "productive" mix stages are well known to those having skill in the rubber mixing art. The sulfur-vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 3 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The example pneumatic tire for use with the present invention may be a race tire, passenger tire, runflat tire, aircraft tire, agricultural, earthmover, off-the-road, medium truck tire, or any pneumatic or non-pneumatic tire. In one example, the tire is a passenger or truck tire. The tire may also be a radial ply tire or a bias ply tire.

After the tire has been built with the rubber formulation of this invention, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). Any of the usual vulcanization processes may be used such as heating in a press or mold and/or heating with superheated steam or hot air. Such tires can be built, shaped, molded and cured by various methods which are known and are readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Comparative Example 1 and Examples 2-4

In this series of experiments rubber formulations were prepared by mixing trans-1,4-isoprene-butadiene copolymers with natural rubber. A control which did not include any trans-1,4-isoprene-butadiene copolymer was also prepared and evaluated for comparative purposes. Non-productive rubber compounds were made by mixing the following ingredients into a natural rubber control (Example 1) or blends that contained 90 phr of the natural rubber and 10 phr of various trans-1,4-isoprene-butadiene copolymers:

| | |
|---|---|
| carbon black | 50 phr |
| zinc oxide | 3 phr |
| fatty acid | 1 phr |
| antidegradent | 1 phr |
| processing oil | 4 phr |

The uncured rubber formulations where subsequently tested to determine the physical properties of the blends. The rubber formulations were subsequently compounded with 1.6 phr of sulfur, 1.2 phr of an accelerator, and 0.1 phr of a retarder to make productive formulations which were later cured and tested for physical properties. The physical properties of the cured and uncured rubber formulations are reported in Table 1.

TABLE 1

| | Example 1 | Example 2 | Example 3 | Example 4 |
|---|---|---|---|---|
| Natural rubber | 100 phr | 90 phr | 90 phr | 90 phr |
| TIBR | — | 10 phr | 10 phr | 10 phr |
| Bd in TIBR | N/A | 11.0% | 8.9% | 10.7% |
| TIBR Mooney* | N/A | 29 | 37 | 55 |
| Green Strength Stress @ | | | | |
| 40% Strain | .35 | .59 | .63 | .63 |
| 80% Strain | .41 | .66 | .72 | .74 |
| 120% Strain | .43 | .72 | .83 | .88 |
| 240% Strain | .49 | .89 | 1.14 | 1.27 |
| 480% Strain | .91 | 1.42 | 1.76 | 1.90 |
| RPA | | | | |
| Uncured G' | 246 | 231 | 249 | 260 |
| G' @ 10% | 1652 | 1713 | 1684 | 1690 |
| TD @ 10% | .099 | 0.10 | 0.10 | .099 |
| Rheometer | | | | |
| Delta T | 17.3 | 18.4 | 17.8 | 17.7 |
| T90 | 13.4 | 13.2 | 12.6 | 12.5 |
| Stress/Strain | | | | |
| Tensile Strength | 25.5 | 23.9 | 24.0 | 24.1 |
| Elong @ break | 455% | 426% | 442% | 446% |
| 300% Modulus | 17.3 | 17.5 | 16.7 | 16.6 |
| Hysteresis | | | | |
| Rebound, 100° C. | 67 | 67 | 67 | 67 |
| Abrasion | | | | |
| Grosch, Med S | 107 | 104 | 103 | 102 |

*The Mooney ML 1 + 4 viscosity of the trans-1,4-isoprene-butadiene copolymer was measured at a temperature of 100° C.

As can be seen from Table 1, substantial improvements in green strength were realized by incorporating trans-1,4-isoprene-butadiene copolymer (TIBR) into the natural rubber. The best improvement in green strength was attained with the trans-1,4-isoprene-butadiene copolymer utilized in Example 4 which had a Mooney viscosity at 100° C. of 55. Accordingly, it is preferred for the trans-1,4-isoprene-butadiene copolymer employed in the rubber compositions of this invention to have a Mooney ML 1+4 viscosity at 100° C. which is above 37 and preferably above 50 (typically within the range of about 50 to about 60). The other measured properties were not significantly affected by the addition of the TIBR's.

Comparative Examples 5-6

In this series of experiments rubber formulations were prepared by mixing trans-1,4-isoprene-butadiene copolymer with natural rubber utilizing the same procedure and formulations which were employed in Comparative Example 1 and Examples 2-4. However the level of bound butadiene in the isoprene-butadiene copolymer was increased in Comparative Example 5 and Comparative Example 6 to 15.7% and 19.0%, respectively, with the Mooney ML 1+4 viscosity at 100° C. of the isoprene-butadiene copolymer being held at about 55. The uncured rubber formulations where subsequently tested to determine the physical properties of the blends and the rubber formulations were subsequently compounded, cured, and tested for physical properties utilizing the curatives and procedure used in Comparative Example 1 and Examples 2-4. The physical properties of the cured and uncured rubber formulations are reported in Table 2 which also includes the results attained for Comparative Example 1 and Example 4.

TABLE 2

|  | Example 1 | Example 4 | Example 5 | Example 6 |
|---|---|---|---|---|
| Natural rubber | 100 phr | 90 phr | 90 phr | 90 phr |
| TIBR | — | 10 phr | 10 phr | 10 phr |
| Bd in TIBR | N/A | 10.7% | 15.7% | 19.0% |
| TIBR Mooney* | N/A | 55 | 56 | 57 |
| Green Strength | | | | |
| Stress @ | | | | |
| 40% Strain | .35 | .63 | .57 | .52 |
| 80% Strain | .41 | .74 | .65 | .58 |
| 120% Strain | .43 | .88 | .72 | .62 |
| 240% Strain | .49 | 1.27 | .94 | .79 |
| 480% Strain | .91 | 1.90 | 1.58 | 1.37 |
| RPA | | | | |
| Uncured G' | 246 | 260 | 262 | 270 |
| G' @ 10% | 1652 | 1690 | 1706 | 1746 |
| TD @ 10% | .099 | .099 | .097 | .098 |
| Rheometer | | | | |
| Delta T | 17.3 | 17.7 | 17.8 | 18.3 |
| T90 | 13.4 | 12.5 | 13.8 | 15.0 |
| Stress/Strain | | | | |
| Tensile Strength | 25.5 | 24.1 | 24.4 | 23.7 |
| Elong @ break | 455% | 446% | 442% | 423% |
| 300% Modulus | 17.3 | 16.6 | 17.1 | 17.5 |
| Hysteresis | | | | |
| Rebound, 100° C. | 67 | 67 | 68 | 67 |
| Abrasion | | | | |
| Grosch, Med S | 107 | 102 | 104 | 96 |

*The Mooney ML 1 + 4 viscosity of the trans-1,4-isoprene-butadiene copolymer was measured at a temperature of 100° C.

As can be seen from Table 1, the best improvement in green strength was attained with the trans-1,4-isoprene-butadiene copolymer which contained 10.7% bound butadiene. In fact, as the level of bound butadiene in the 1,4-isoprene-butadiene copolymer is increased above a level of about 10% the green strength of the compounded rubber formulations was negatively impacted. Accordingly, it is preferred for the trans-1,4-isoprene-butadiene copolymer employed in the rubber compositions of this invention to contain from 5 weight percent to 20 weight percent 1,3-butadiene repeat units and from 88 weight percent to about 95 weight percent isoprene repeat units, with the most preferred level of 1,3-butadiene repeat units being in a range of 5 to 15 weight percent.

While certain representative embodiments and details have been shown for the purpose of illustrating the subject invention, it will be apparent to those skilled in this art that various changes and modifications can be made therein without departing from the scope of the subject invention.

What is claimed is:

1. A rubber composition consisting of (1) 3 phr to about 30 phr of a trans-1,4-isoprene-butadiene copolymer containing 5 weight percent to 10 weight percent 1,3-butadiene repeat units and from 90 weight percent to about 95 weight percent isoprene repeat units, wherein the trans-1,4-isoprene-butadiene copolymer has a Mooney ML 1+4 viscosity at 100° C. which is within the range of 65 to 75, and wherein the trans-1,4-isoprene-butadiene copolymer has a melting point which is within the range of 30° C. to 65° C.; (2) 70 phr to 97 phr of at least one other elastomer selected from the group consisting of natural rubber, synthetic polyisoprene homopolymer rubber, polybutadiene rubber, styrene-butadiene rubber, styrene-isoprene rubber, and styrene-isoprene-butadiene rubber; (3) a reinforcing filler; (4) a processing oil; (5) a antioxidant; (6) optionally, an antiozonant, and (7) optionally, a tackifier resin; wherein the rubber composition is cured.

2. The rubber composition as specified in claim 1 wherein the other elastomer is comprised of repeat units which are derived from 1,3-butadiene.

3. The rubber composition as specified in claim 1 wherein the other elastomer is natural rubber.

4. The rubber composition as specified in claim 1 wherein the rubber composition contains from 5 phr to 20 phr of the trans-1,4-isoprene-butadiene copolymer and from 80 phr to 95 phr of the other elastomer.

5. The rubber composition as specified in claim 1 wherein the reinforcing filler is carbon black.

6. The rubber composition as specified in claim 1 wherein the reinforcing filler is silica.

7. A tire which is comprised of a generally toroidal-shaped carcass with an outer circumferential tread, two spaced beads, at least one ply extending from bead to bead and sidewalls extending radially from and connecting said tread to said beads, wherein said circumferential tread is adapted to be ground-contacting, wherein the circumferential tread is comprised of the rubber composition specified in claim 1.

8. A tire which is comprised of a generally toroidal-shaped carcass with an outer circumferential tread, two spaced beads, at least one ply extending from bead to bead and sidewalls extending radially from and connecting said tread to said beads, wherein said circumferential tread is adapted to be ground-contacting, wherein the sidewalls are comprised of the rubber composition specified in claim 1.

9. The tire as specified in claim 8 wherein the tire is a non-pneumatic tire.

10. The tire as specified in claim 8 wherein the tire is a pneumatic tire.

* * * * *